United States Patent
Mun et al.

(10) Patent No.: US 6,724,742 B1
(45) Date of Patent: Apr. 20, 2004

(54) METHOD FOR CONTROLLING GATED TRANSMISSION OF DEDICATED CHANNEL IN W-CDMA COMMUNICATION SYSTEM

(75) Inventors: Hyun-Jung Mun, Namyangju-shi (KR); Kyou-Woong Kim, Suwon-shi (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 09/547,505

(22) Filed: Apr. 12, 2000

(30) Foreign Application Priority Data

Apr. 12, 1999 (KR) .......................... 1999-13611
Apr. 13, 1999 (KR) .......................... 1999-12880
May 20, 1999 (KR) .......................... 1999-18343

(51) Int. Cl.⁷ ............................................. H04B 7/216
(52) U.S. Cl. ....................................... 370/335; 370/342
(58) Field of Search ................................. 370/320, 322, 370/335, 342, 441

(56) References Cited

U.S. PATENT DOCUMENTS 6,064,663 A * 5/2000 Honkasalo et al. ......... 370/335
6,480,481 B1 * 11/2002 Park et al. .................. 370/335
6,545,989 B1 * 4/2003 Butler ......................... 370/329
6,587,447 B1 * 7/2003 Wang et al. ................. 370/335
2001/0055293 A1 * 12/2001 Parsa et al. ................. 370/342

FOREIGN PATENT DOCUMENTS

JP 10-070772 3/1998

OTHER PUBLICATIONS

Japanese Office Action dated Dec. 16, 2003, issued in a counterpart application, namely, Appln. No. 2000–611393.

* cited by examiner

*Primary Examiner*—Chau Nguyen
*Assistant Examiner*—Christine Ng
(74) *Attorney, Agent, or Firm*—Dilworth & Barrese LLP

(57) ABSTRACT

There is provided a method for controlling gated transmission of a dedicated channel signal in a W-CDMA communication system. In the W-CDMA communication system, a dedicated control channel has 15 slots in one frame, each slot includes a TFCI bit, a TPC bit, and a pilot bit, and the dedicated control channel and a dedicated data channel for transmitting packet data are multiplexed prior to transmission. In an embodiment of the present invention, a base station transmits to a mobile station a gated transmission command message including a gating rate and a gated transmission start time for gated transmission of the dedicated control channel signal, if no data exists on the dedicated data channel for a predetermined period of time. Then, the base station transmits the dedicated control channel signal in a gated mode at the gated transmission start time set in the gated transmission command message.

13 Claims, 16 Drawing Sheets and a mobile station (User Equipment Mobile Station,
UE(MS)) in a W-CDMA (Wideband-Code Division Multiple Access) communication system, and in particular, to a
method of efficiently using dedicated channels for transmission of packet data.

METHOD FOR CONTROLLING GATED TRANSMISSION OF DEDICATED CHANNEL IN W-CDMA COMMUNICATION SYSTEM

BACKGROUND OF THE INVENTION

1. Field of the Invention

The present invention relates generally to a method of controlling gated transmission (i.e., intermittent transmission of a dedicated control channel signal) between a base station (UMTS Terrestrial Radio Access Network, UTRAN) and a mobile station (User Equipment Mobile Station, UE(MS)) in a W-CDMA (Wideband-Code Division Multiple Access) communication system, and in particular, to a method of efficiently using dedicated channels for transmission of packet data.

2. Description of the Related Art

A conventional CDMA communication system, principally configured for transmission of voice and data, transmits data on a dedicated channel. To do so, a dedicated channel is assigned to transmit data and is released after the data transmission is complete. The assignment and release of resources is frequently done to provide services other than voice service, such as packet data service in the conventional method. The resulting reconnection time delay makes it difficult to provide satisfactory voice services. In many cases, packet data is discontinuously transmitted, wherein a non-transmission period is interposed between packet transmission periods. When transmitting packet data discontinuously using the conventional channel controlling method, the channel should be either released or maintained during the pauses between data transmission. If the channel is released, reassignment of the channel is time consuming and thus a satisfactory packet data service cannot be provided. On the other hand, channel maintenance ties up resources and increases power consumption causing interference.

Accordingly, there is a need for developing a new method of assigning a channel to provide services other than voice service, for example, packet data services. FIG. 1 illustrates the various states of an UE(MS) defined according to the type of radio resources assigned for data transmission in a W-CDMA communication system.

Referring to FIG. 1, the various channel states of the UE(MS) are categorized into a Cell_DCH state where a dedicated channel is assigned for data transmission, a Cell_FACH state which allows only transmission of a small amount of data on a common channel, a Cell_PCH state which requests an UE(MS) position to be registered in terms of a cell, and a URA_PCH (UTRAN Registration Area_PCH) state which requests an UE(MS) position to be registered in terms of a UTRAN Registration Area (URA). No data transmission is allowed in both the Cell_PCH and URA_PCH states. Assignment of a dedicated channel to an UE(MS) in the Cell_DCH state is considered in two ways: first, the dedicated channel is continuously used until it is released; and second, the dedicated channel is used only while a predetermined amount of data is transmitted or data is transmitted for a predetermined time. The conventional method supports an intermittent burst data transmission service by allowing continuous use of a dedicated channel until all the data is transmitted, or releasing a dedicated channel after transmission of burst data and then reassigning the dedicated channel by use of a dedicated reassignment request message on a common channel. In the former case, uplink and downlink dedicated control channels should be transmitted continuously to maintain them even in the absence of data to be transmitted on a dedicated data channel, thereby dissipating the channels and unnecessary power. In the latter case, services cannot be provided stably because the time to reassign channels varies.

FIGS. 2A to 3B are the structures of signals transmitted from a UTRAN and an UE(MS) according to the conventional technology.

FIG. 2A illustrates the structure of an UE(MS) transmission signal upon the absence of data to be transmitted on a uplink DPDCH (Dedicated Physical Data Channel) during uplink data transmission, and FIG. 2B illustrates the structure of a UTRAN transmission signal upon the absence of data to be transmitted on a downlink DPDCH during downlink data transmission. Reference numeral 200 in FIG. 2A and reference numeral 250 in FIG. 2B denote time points when transmission of dedicated data channels are stopped due to absence of transmission data on the uplink DPDCH and on the downlink DPDCH, respectively. After the time points, only dedicated physical control channels(DPCCH) are continuously transmitted so as not to lose synchronization of the uplink and downlink. The continuous transmission of the dedicated control channels (DPCCHs) is advantageous in that when uplink or downlink transmission data is generated, the data can be reliably transmitted on the dedicated data channels (DPDCHs) without any time delay. This can be confirmed from FIGS. 3A and 3B.

FIG. 3A is a signal diagram illustrating data transmission on a uplink dedicated data channel (DPDCH) upon generation of data to be transmitted on a uplink during transmission of only a uplink dedicated control channel (DPCCH), and FIG. 3B is a signal diagram illustrating data transmission on a downlink dedicated data channel (DPDCH) upon generation of data to be transmitted on a downlink during transmission of only a downlink dedicated control channel (DPCCH). Reference numeral 300 in FIG. 3A and reference numeral 350 in FIG. 3B denote time points when data transmission resumes on the dedicated data channel. Frames are transmitted again immediately after the time points when transmission data is generated. Unfortunately, the continuous transmission of uplink and downlink dedicated control channels (DPCCHs) increases interference on the uplink and downlink. As a result, uplink and downlink channel capacities are decreased and UE(MS) power consumption is increased.

Therefore, gated transmission of dedicated control channels (DPCCHs) is preferable in order to use the transmission channels efficiently and to provide stable service. Gated transmission also minimizes the increase of interference caused by the continuous transmission of bidirectional dedicated controls channels and the increase of power consumption in an UE(MS).

SUMMARY OF THE INVENTION

It is, therefore, a first object of the present invention to provide a method of gated transmitting a dedicated control channel (DPCCH) in a gated mode when data is not transmitted on a dedicated data channel for a predetermined time after the dedicated channel is assigned in a mobile communication system.

It is a second object of the present invention to provide a method of gated transmitting a uplink dedicated control channel signal in a gated mode by requesting a gated transmission to a UTRAN when an UE(MS) has no data to be transmitted on a uplink for a predetermined time in a mobile communication system.

It is a third object of the present invention to provide a method of gated transmitting a downlink dedicated control channel signal in a gated mode by controlling an UE(MS) when there is no data to be transmitted on a downlink for a predetermined time in a mobile communication system.

It is a fourth object of the present invention to provide a method of gated receiving a uplink dedicated control channel signal in a gated mode from an UE(MS) by a UTRAN in a mobile communication system.

It is a fifth object of the present invention to provide a method of gated receiving a downlink dedicated control channel signal in a gated mode from a UTRAN by an UE(MS) in a mobile communication system.

It is a sixth object of the present invention to provide a method of transmitting data on a uplink by an UE(MS) when transmission data is generated during gated transmission in a mobile communication system.

It is a seventh object of the present invention to provide a method of transmitting data on a downlink by a UTRAN when transmission data is generated during gated transmission in a mobile communication system.

Briefly, these and other objects can be achieved by providing a gated transmission method. In the gated transmission method, a first party transmits a message indicating that a gated transmission condition is satisfied. Upon receipt of a response message from a second party, the first party transmits a gated transmission command message. Then, the first party performs gated transmission according to parameters included in the gated transmission message. The parameters include a gating rate, a gated transmission start time, a gated transmission pattern, and a power increment by which to increase the transmission power of a channel when transmitting data on the channel during the gated transmission.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

The present invention pertains to the gated transmission of a dedicated control channel (DPCCH) when no data is transmitted for a predetermined period of time during transmission of data via dedicated channels (DPDCH) in a W-CDMA mobile communication system. Gated transmission minimizes the power consumption and channel dissipation in an UE(MS), which result from the continuous transmission of a dedicated control channel in the absence of data to be transmitted on a dedicated data channel (DPDCH). The gated transmission of a dedicated control channel (DPCCH) in the W-CDMA communication system is advantageous because a physical channel can be maintained in sync, the transmission power can be reduced, and a closed loop power control can be implemented.

The following description is conducted assuming that a frame is 10 msec in duration, there are 15 power control groups present in one frame, and one power control group is about 0.667 msec in duration. However, those values are merely selected for better understanding of the subject matter of the present invention.

The gated transmission method of the present invention is not continuously transmitting dedicated control channel signal but gated transmitting.

Whether a UTRAN determines gating parameters in response to an UE(MS) request or the UTRAN requests an UE capability to determine gating parameter, it can be further contemplated that the gating parameters can be set at a call set-up by mutual agreement between the UTRAN and the UE(MS). The gating parameters include a gating indicator, a gating rate, a gated transmission start time, a gated transmission pattern, and an increase power strength when transmitting data on dedicated data channel in the embodiment of the present invention, but it is to be clearly understood that other parameters can be added when necessary.

Figure 1:
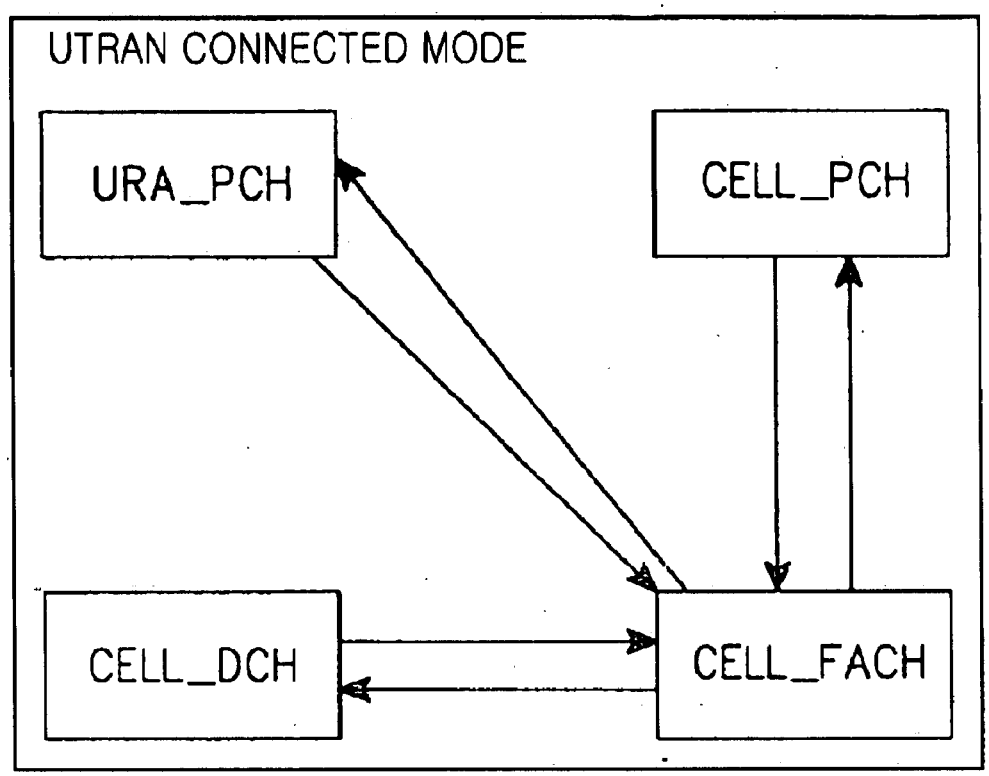
FIG. 1 is a state transition diagram for packet service in a W-CDMA communication system.
Figure 2A:
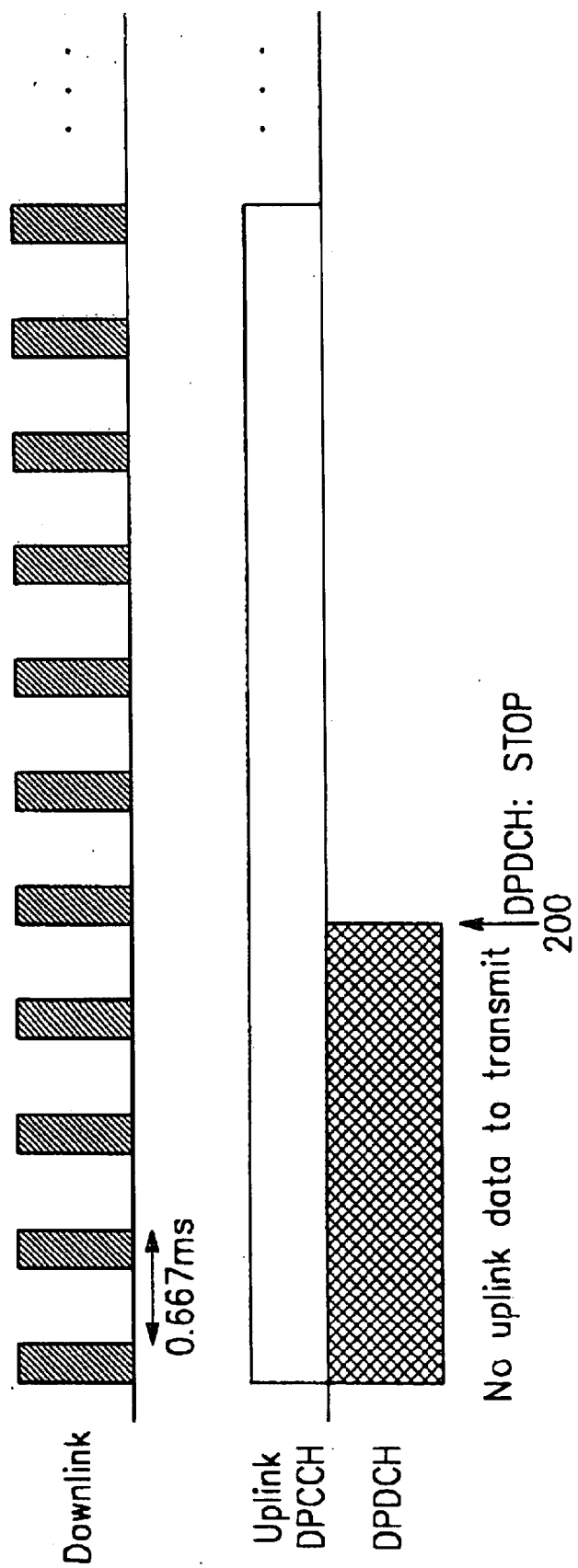
FIG. 2A is a diagram of signals communicated between a UTRAN and an UE(MS) when there is no data to be transmitted on a uplink according to conventional technology.
Figure 2B:
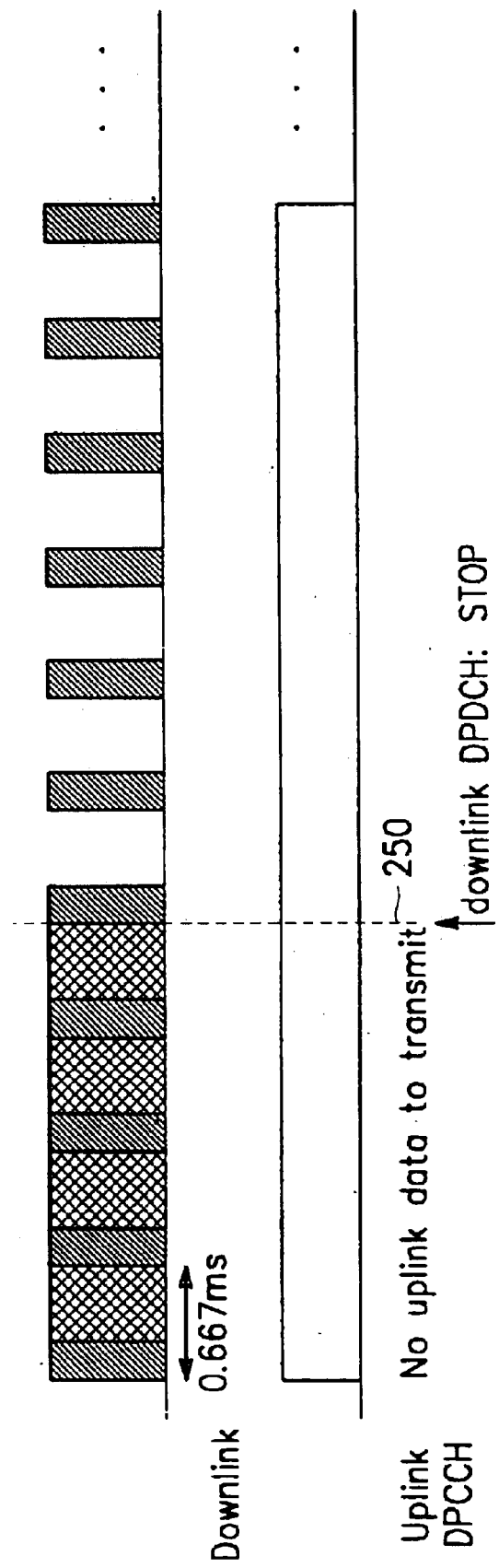
FIG. 2B is a diagram of signals communicated between a UTRAN and an UE(MS) when there is no data to be transmitted on a downlink according to the conventional technology.
Figure 3A:
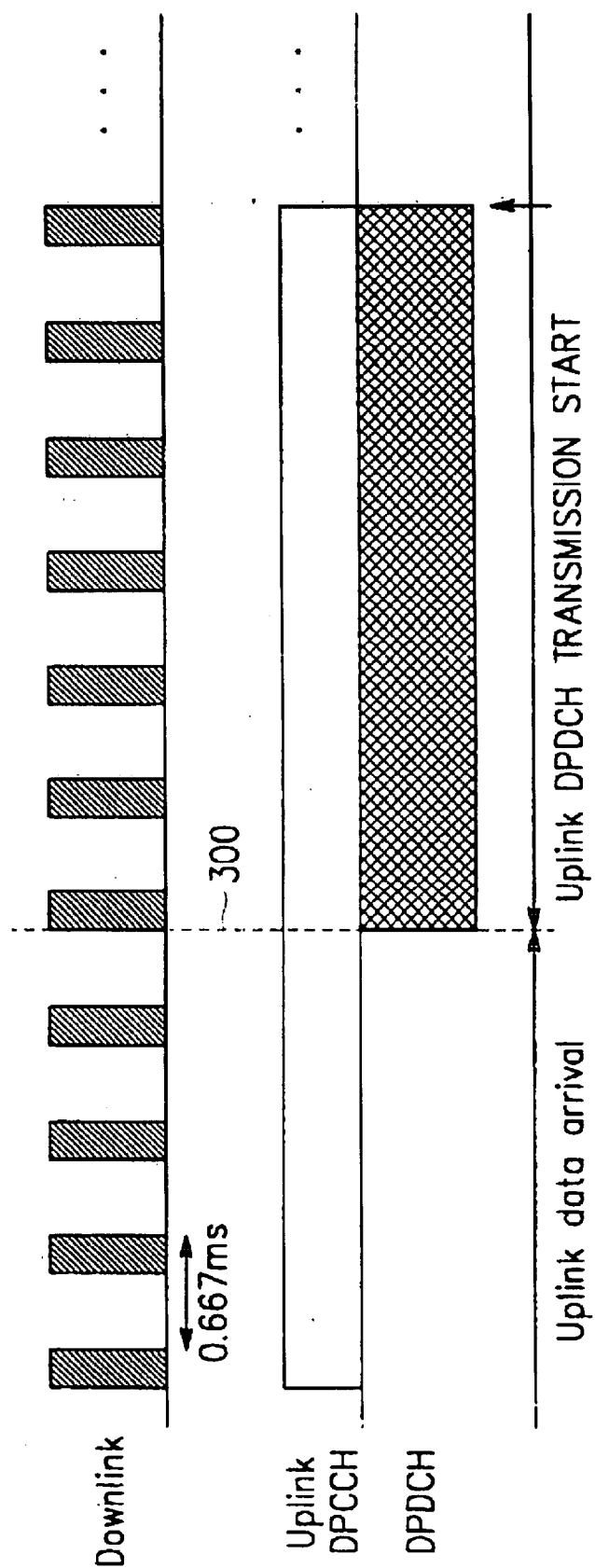
FIG. 3A is a diagram of signals communicated between a UTRAN and an UE(MS) when transmission of a uplink dedicated data channel resumes upon generation of data to be transmitted on the uplink dedicated data channel in a non-uplink dedicated data channel transmission state according to the conventional technology.
Figure 3B:
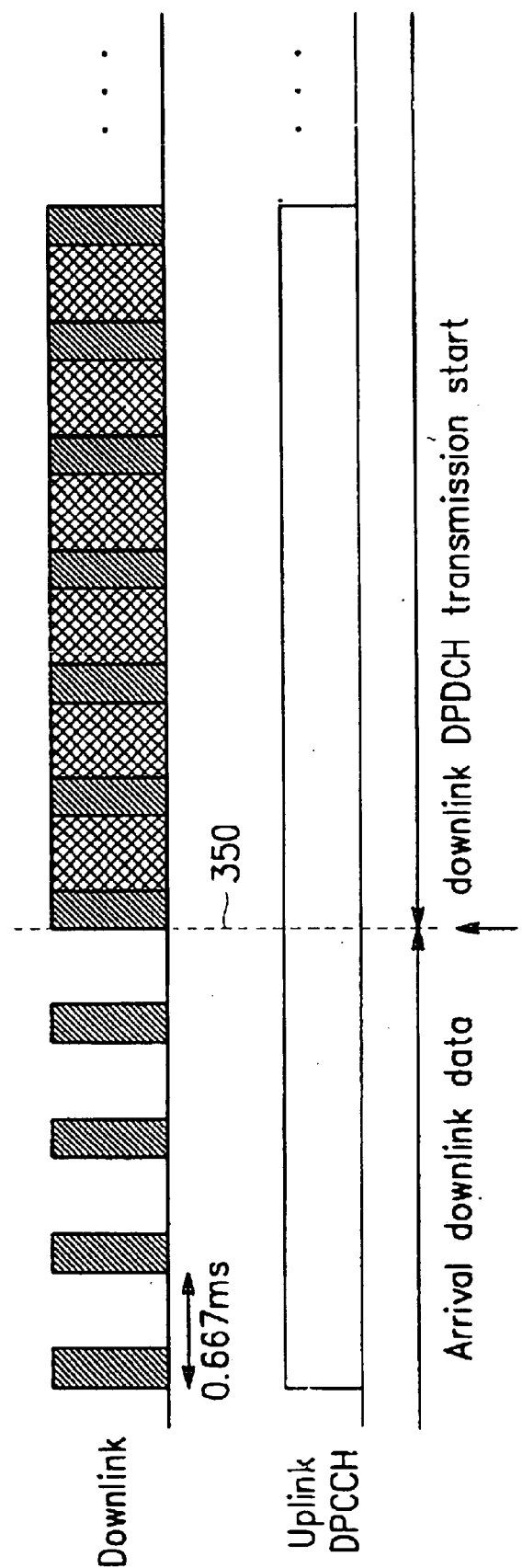
FIG. 3B is a diagram of signals communicated between a UTRAN and an UE(MS) when transmission of a downlink dedicated data channel resumes upon generation of data to be transmitted on the downlink dedicated data channel in a non-downlink dedicated data channel transmission state according to the conventional technology.
Figure 4A:
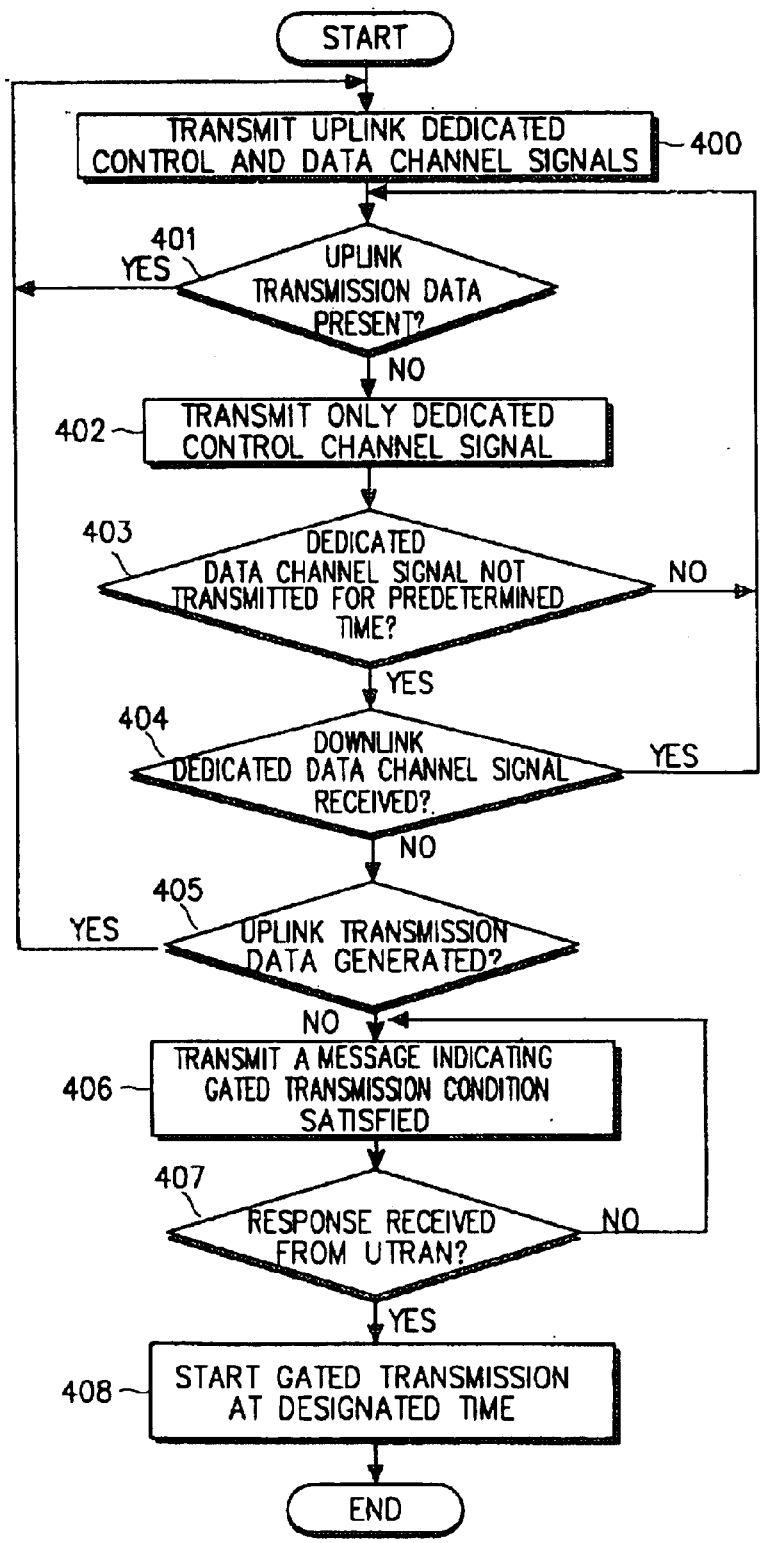
FIG. 4A is a flowchart illustrating an UE(MS) operation for a gated transmission in the absence of uplink transmission data according to an embodiment of the present invention.

FIG. 4A is a flowchart illustrating a gated transmission procedure of a uplink dedicated channel in an UE(MS) in the absence of uplink transmission data according to an embodiment of the present invention.

Referring to FIG. 4A, the UE(MS) transmits control data on a uplink dedicated control channel (DPCCH) and packet data on a uplink dedicated data channel (DPDCH) in step 400. As above, after the UE(MS) transmits the data on dedicated channel, the UE checks whether uplink transmission data exists in step 401. In the presence of uplink transmission data, the UE(MS) returns to step 400 and transmits the data. On the other hand, in the absence of uplink transmission data, the UE(MS) transmits only control data on the dedicated control channel (DPCCH) in step 402.

In step 403, the UE(MS) determines a time period for which no data is transmitted on the dedicated data channel (DPDCH) in order to prevent gate transmission during a short non-data transmission period. If the dedicated data channel (DPDCH) has not been used for the predetermined time in step 403, the UE(MS) checks whether data has been received on a downlink dedicated data channel (DPDCH) in step 404. Checking whether data has been received on a downlink dedicated data channel (DPDCH) ensures that the uplink and downlink dedicated data channels (DPDCHs) are not transmitting and receiving. This is a prerequisite for gated transmission on dedicated control channel (DPCCH)s (DPCCHs). If data is received on the downlink dedicated data channel (DPDCH), the UE(MS) returns to step 401 to check whether uplink transmission data exist. Upon generation of uplink transmission data in step 401, the UE(MS) returns to step 400. However, it can be further contemplated that since a uplink gated transmission condition is satisfied in step 403, the UE(MS) skips step 404 and notifies the UTRAN that the UE(MS) is capable of uplink gated transmission so that the UTRAN determines whether to perform gated transmission by checking for the presence or absence of downlink transmission data.

In step 405, the UE(MS) checks whether data has been generated for transmission on the uplink dedicated data channel (DPDCH) while checking whether data has been received on the downlink dedicated data channel. If the UE(MS) detects uplink transmission data in step 405, the UE(MS) returns to step 400. In the absence of uplink transmission data in step 405, the UE(MS) transmits a message notifying that the gated transmission condition is satisfied to the UTRAN in step 406. The message may be a MEASUREMENT REPORT defined by the universal mobile telecommunication system (UMTS).

Figure 9:
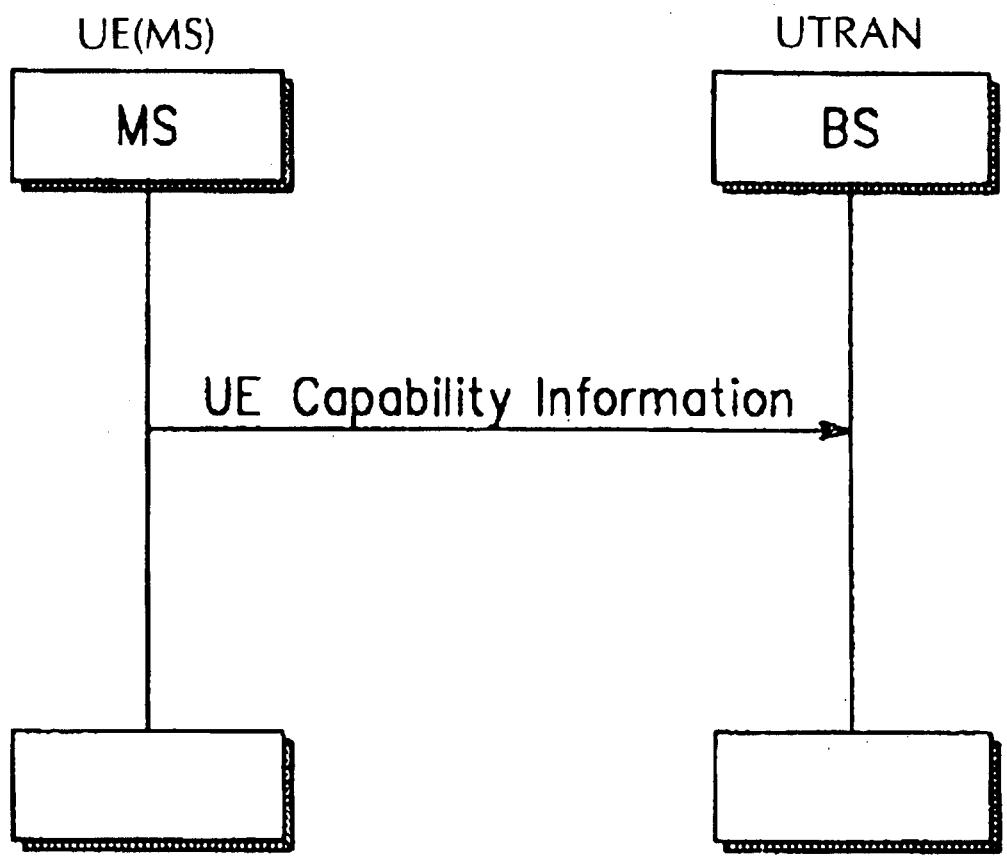
FIG. 9 illustrates a capability negotiation procedure in an UE(MS)

Then, the UE(MS) awaits receipt of a response message from the UTRAN in step 407. The response message should include information about a gating rate, a gated transmission start time, an increase power strength when transmitting data on dedicated data channel to be used for power control during gated transmission, and a gated transmission pattern, which is necessary for the UE(MS) to perform a gated transmission. When the UTRAN prepare the response message, the UTRAN reflects the result of checking whether downlink transmission data exists and the gated transmission capability of the UE(MS) if the UTRAN is informed of the capability through a procedure as shown in FIG. 9 in determining the gated transmission-related parameters. Furthermore, the UTRAN can limit an available data rate for gated transmission and include the data rate limit in the response message. The response message can be constructed by adding message fields defined in FIG. 10 to a UMTS-defined message "TRANSPORT CHANNEL RECONFIGURATION" or "PHYSICAL CHANNEL RECONFIGURATION".

Figure 10:
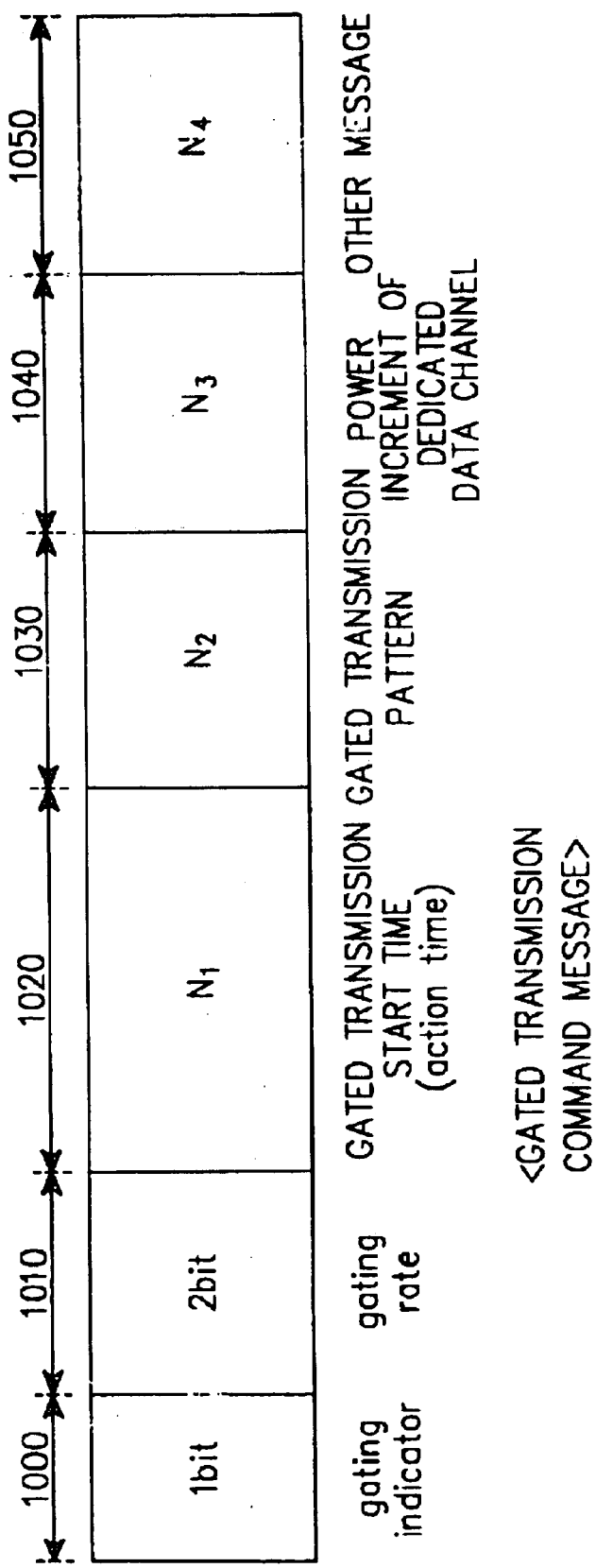
FIG. 10 is the format of a gated transmission command message according to the embodiment of the present invention.

FIG. 10 illustrates the structure of a gated transmission command message generated from a UTRAN, including parameters for gated transmission of a dedicated control channel.

Referring to FIG. 10, a gating indicator 1000 can be a one bit-field for informing whether gated transmission-related information exists. A gating rate field designates a gating transmission rate 1010. $N_1$ 1020 indicates a gated transmission start time and varies in the number of bits depending on the form used to express the start time. $N_2$ 1030 is a field that provides a gated transmission pattern. That is, $N_2$ 1030 determines whether a gated transmission pattern is to be made periodical or random, or informs a downlink gated transmission pattern to be used. $N_3$ 1040 provides a power increment of a dedicated data channel which is used to compensate for power control losses that occur during data transmission in a gated transmission mode.

Figure 6:
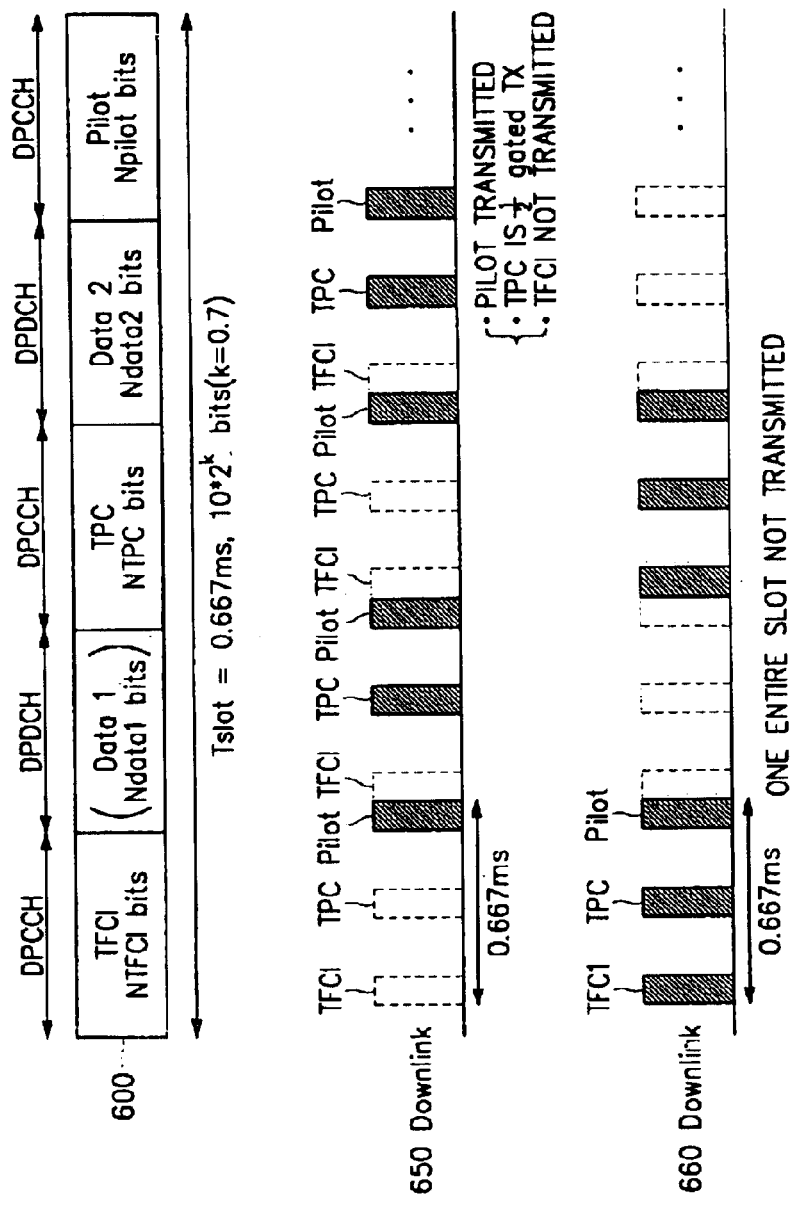
FIG. 6 illustrates a distributed channel structure and an exemplary downlink gated transmission pattern.

FIG. 6 illustrates an example of gated transmission of a dedicated control channel according to the embodiment of the present invention.

Referring to FIG. 6, reference numeral 600 denotes the structure of a downlink channel and reference numerals 650 and 660 denote exemplary gated transmission patterns of a downlink dedicated control channel. The gated transmission in those patterns is possible because the dedicated control channel is distributed as shown in the downlink channel structure 600. In the gated transmission 650, only TFCI (Transport Format Combination Indicator) bits in one slot are excluded from transmission on a dedicated control channel. In this case, pilots are transmitted in all slots and TPC (Transmit Power control) bits are transmitted or not depending on the transmission rate of the uplink dedicated control channel. In the gated transmission 660, one entire slot is not transmitted. The gated transmission rates in both cases are ½. Since a gated transmission start time should be set with the UTRAN and the UE(MS) in accurate synchronization with each other, the UE(MS) should wait until a gated transmission start time designated in the response message as shown in step 408 of FIG. 4A. If the response message is received in step 407 of FIG. 4A and the response message sets a limit for the radio resources to be used for gated transmission, only those allowed radio resources should be used during the gated transmission. In addition, gated transmission can be implemented on only one of the uplink and downlink dedicated control channels according to whether the UE(MS) and the UTRAN support gated transmission.

Figure 7A:
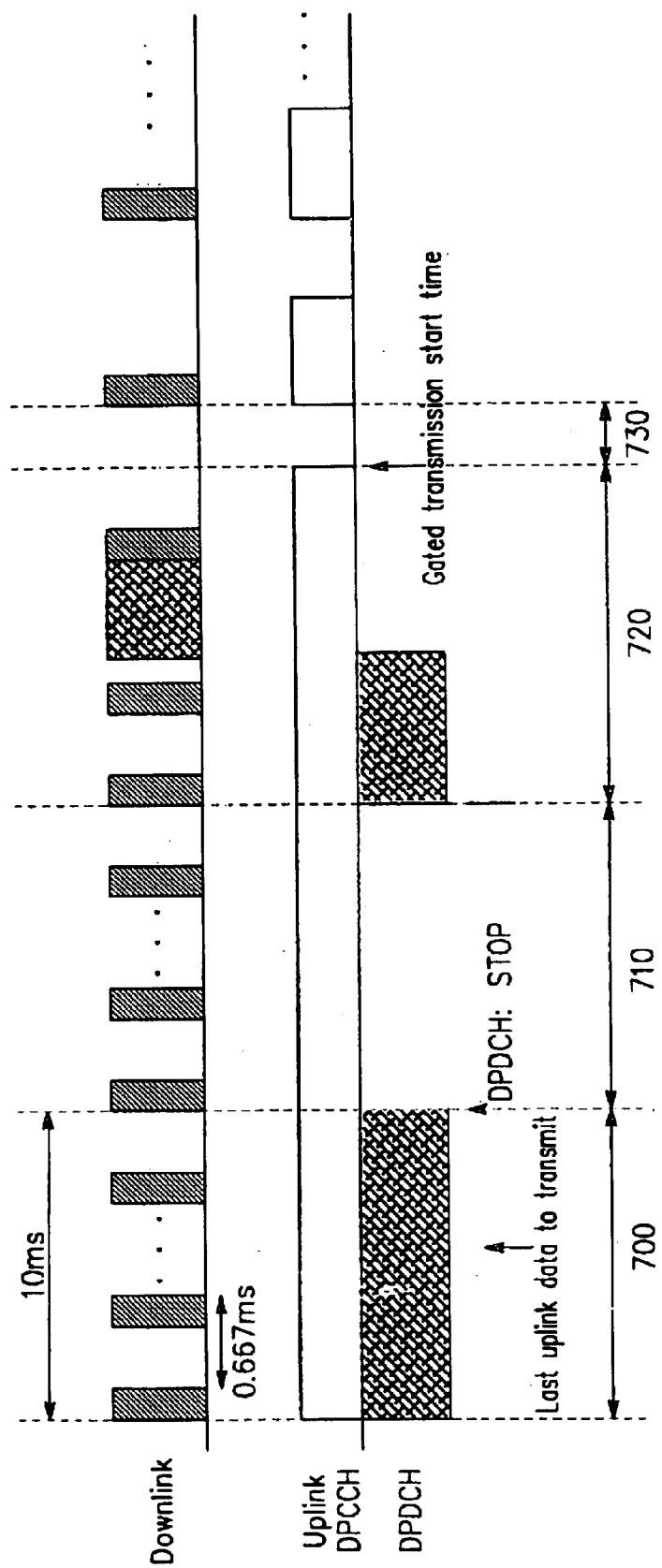
FIG. 7A is a diagram of signals communicated between a UTRAN and an UE(MS) when a gated transmission starts during uplink data transmission according to the embodiment of the present invention.

FIG. 7A is a diagram of transmitted and received signals of a UTRAN and an UE(MS) when gated transmission is performed in the absence of data on a uplink dedicated data channel during uplink data transmission. The drawing shows UE(MS) signals when the message is not retransmitted notifying that a gated transmission condition has been satisfied in step 407 of FIG. 4A.

In FIG. 7A, the uplink dedicated data channel is no longer transmitted after the last frame in a period 700. The uplink dedicated data channel is not in use for a period 710, which is checked in step 403 of FIG. 4A. In a period 720, the UE(MS) transmits the message indicating that the gated transmission condition is satisfied, receives the response message, and waits until the gated transmission start time set in the response message. A period 730 varies according to the response message. FIG. 7A shows a gated transmission route of ⅓. The UTRAN may set the gated transmission rate to ⅓ or ⅕.

Figure 4B:
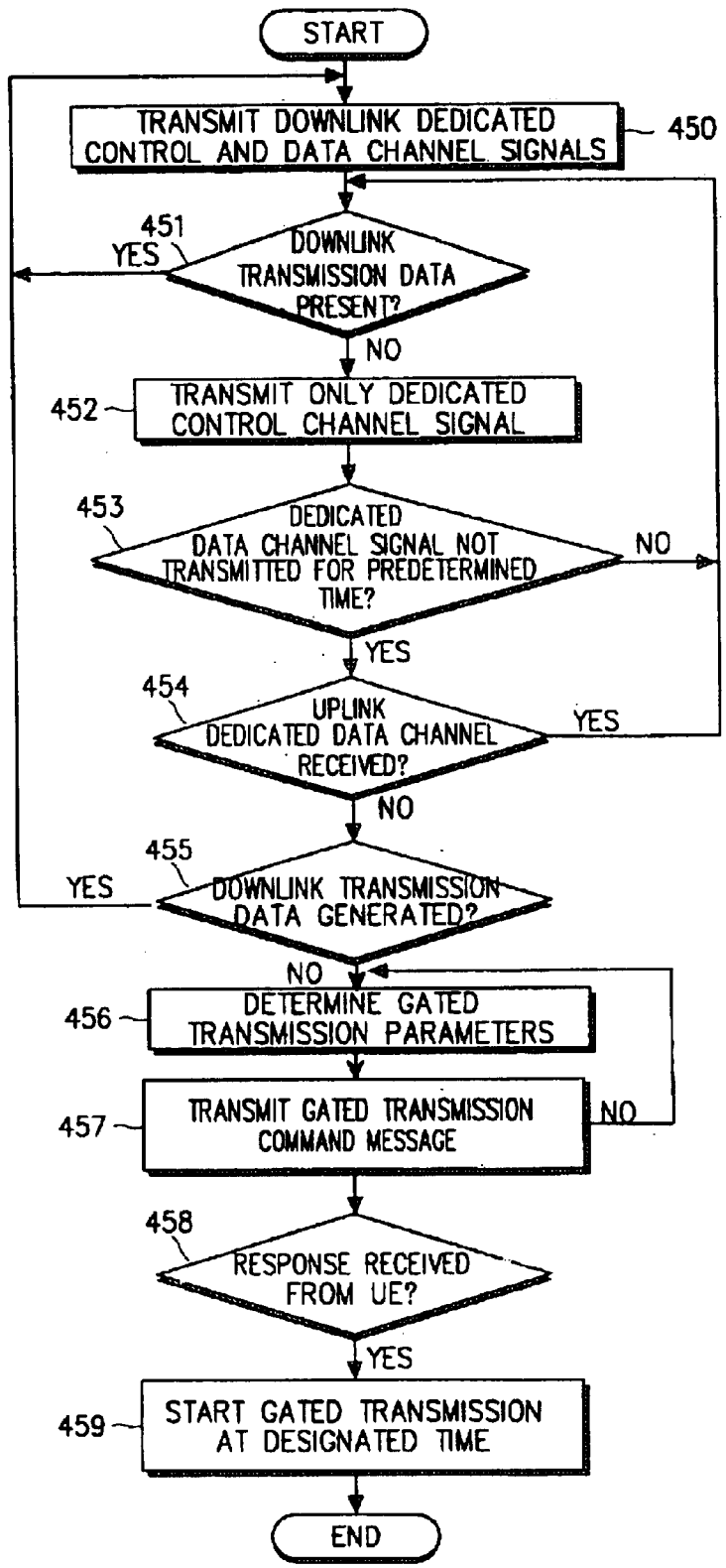
FIG. 4B is a flowchart illustrating a UTRAN operation for a gated transmission in the absence of downlink transmission data according to the embodiment of the present invention.

FIG. 4B is a flowchart illustrating a gated transmission procedure of a downlink dedicated channel in a UTRAN in the absence of downlink transmission data according to the embodiment of the present invention.

Referring to FIG. 4B, the UTRAN transmits control data on a downlink dedicated control channel and packet data on a downlink dedicated data channel in step 450. The UTRAN checks whether downlink transmission data exists in step 451. In the absence of downlink transmission data, the UTRAN transmits only control data on the dedicated control channel in step 452 and checks a period for which no packet data has been transmitted on the dedicated data channel in step 453. If the dedicated data channel has not been transmitted for the predetermined time in step 453, the UTRAN checks whether data has been received on a uplink dedicated data channel in step 454 for the same reason as in step 404 of FIG. 4A. Upon receipt of data on the uplink dedicated data channel, which implies that the UE(MS) continuously transmits data, the UTRAN returns to step 451 to check whether downlink transmission data has been generated.

If no data has been received on the uplink dedicated data channel in step 454, which implies that the gated transmission condition is satisfied, the UTRAN checks again whether downlink transmission data has been generated in step 455. In the absence of downlink transmission data in step 455, the UTRAN generates a gated transmission command message and transmits it to the UE(MS) in steps 456 and 457. The message can be constructed by adding the fields defined in FIG. 10 to an UMTS-defined message, TRANSPORT CHANNEL RECONFIGURATION or PHYSICAL CHANNEL RECONFIGURATION. Upon generation of downlink transmission data in step 455, the UTRAN returns to step 450 to transmit using the dedicated data channel and the dedicated control channel.

Because the UTRAN is responsible for control of gated transmission, the UTRAN determines gated transmission parameters including a gated transmission rate, a gated transmission time period, a gated transmission pattern, and a power increment for a dedicated data channel (DPDCH) in case of generation of transmission data during gated transmission in step 456, prior to transmission of the gated transmission command message in step 457. Information fields of the gated transmission command message are shown in FIG. 10.

If the UTRAN receives information about the current radio environment and gated transmission-related information in a procedure shown in FIG. 9 from the UE(MS) in step 456 of FIG. 4B, it aids in determining the gated transmission parameters. In the embodiment of the present invention, the UTRAN retransmits the gated transmission command message when it fails to receive the response message from the UE(MS) in step 458. Yet, if the UE(MS) provides information about an operation for the case of non-response transmission, the UTRAN operates based on the information.

In step 459 of FIG. 4B, the UTRAN initiates gated transmission of a downlink dedicated control channel. If the UTRAN judges from a received uplink dedicated control channel that the downlink dedicated data channel can be maintained at a reduced gated transmission rate, it orders the UE(MS) to modify the gated transmission. The gated transmission modification can also be requested if the UTRAN determines that it is difficult to maintain the dedicated data channel at a current gated transmission rate. A gated transmission modification command message should include information about when to start a modified gated transmission. The UE(MS) initiates gated transmission in step 408 of FIG. 4A. Upon receipt of the gated transmission modification command message from the UTRAN in this state, the UE(MS) should make a modification to the gated transmission at the time designated in the message.

Figure 7B:
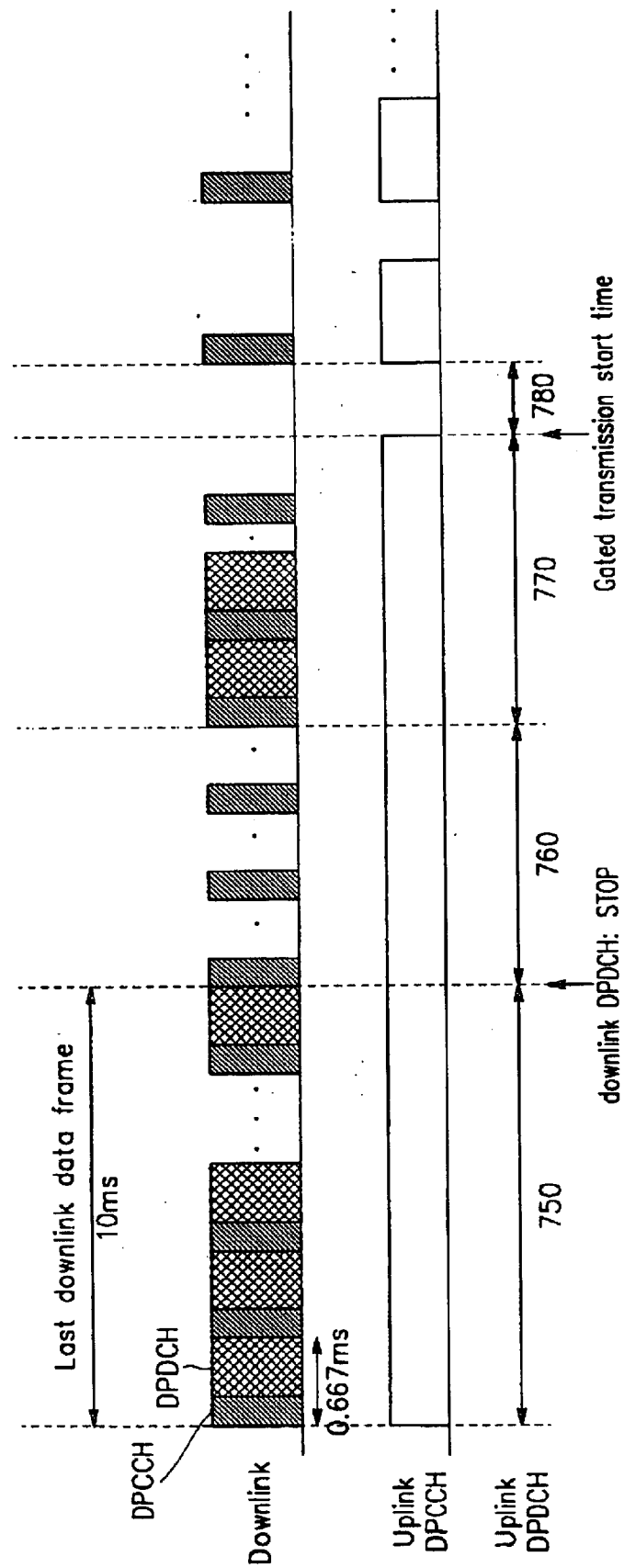
FIG. 7B is a diagram of signals communicated between a UTRAN and an UE(MS) when a gated transmission starts during downlink data transmission according to the embodiment of the present invention.

FIG. 7B is a diagram of transmitted and received signals of a UTRAN when gated transmission is performed at a gating rate of ⅓ due to the absence of data on a downlink dedicated data channel and uplink DPDCH signal during downlink data transmission according to the embodiment of the present invention. In FIG. 7B, the downlink and uplink dedicated data channel is not transmitted for a period 760, which is checked in step 453 of FIG. 4B. A period 770 is set in the gated transmission command message transmitted in step 457 of FIG. 4B. A period 780 is also set in the gated transmission command message. FIG. 7B is the embodiment of gating rate ⅓ transmission.

Figure 5A:
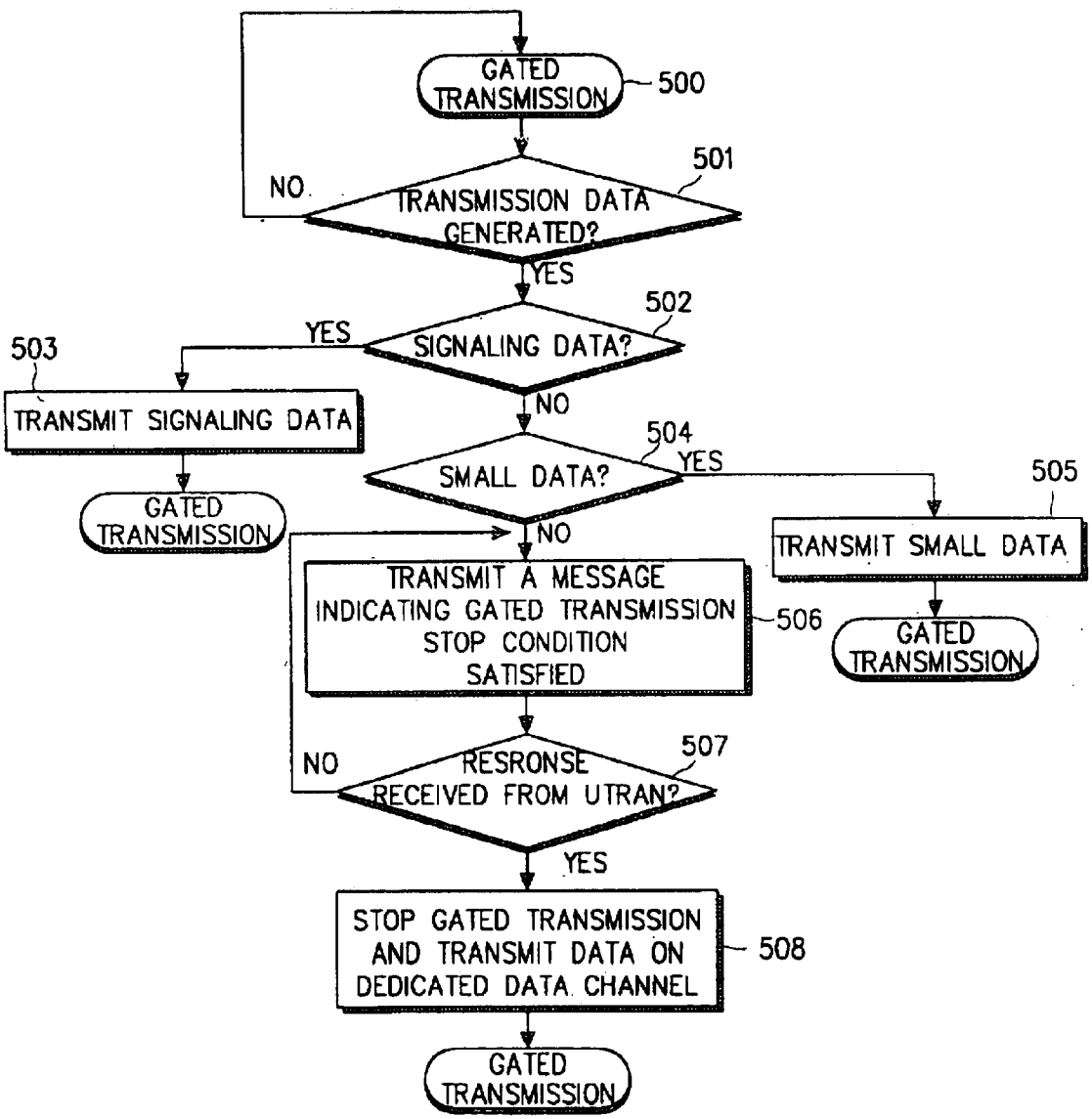
FIG. 5A is a flowchart illustrating an UE(MS) operation upon generation of uplink transmission data during a gated transmission according to the embodiment of the present invention.

FIG. 5A is a flowchart illustrating an UE(MS) operation when uplink transmission data is generated during gated transmission of a uplink dedicated control channel according to the embodiment of the present invention.

Referring to FIG. 5A, gated transmission of the dedicated control channel is in progress in step 500. To compensate for the decrease of a power control cycle in transmitting a dedicated data channel during the gated transmission, the transmission power of the dedicated data channel is increased. In this case, signaling data and traffic data are transmitted as long as the traffic data is so small that the increased power-caused interference is less than a capacity increase that gated transmission brings about. In step 501, it is checked whether transmission data is generated. If so, the process proceeds to step 502. If not, the process proceeds to step 500. In step 502, the UE(MS) determines whether transmission data is signaling or traffic data. If it is signaling data, it is always transmitted in step 503 because the signaling data is small. On the other hand, if it is traffic data, the UE(MS) checks the size of the traffic data in step 504 and transmits it during the gated transmission if it is small in step 505.

If the traffic data is large, the UE(MS) transmits a message indicating that a gated transmission stop condition has been satisfied in step 506 and determines whether a response message has been received from the UTRAN in step 507. If the UE(MS) fails to receive the response message, the UE(MS) retransmits the above message in accordance with the embodiment of the present invention. The response message should include information about radio resources to be used and a time point to use them. The UE(MS) starts to transmit data on the dedicated data channel at the designated time. If data is to be transmitted during the gated transmission as in steps 503 and 505, the dedicated control channel can be transmitted in a gated mode or in a continuous transmission mode to increase the decoding efficiency of a receiver in the second party. Also for the period between step 506 and step 507, the dedicated control channel can be transmitted in the gated mode or in the continuous transmission mode. An UMTS-defined message, MEASUREMENT REPORT can be used as the message indicating that a gated transmission stop condition is satisfied.

Figure 8A:
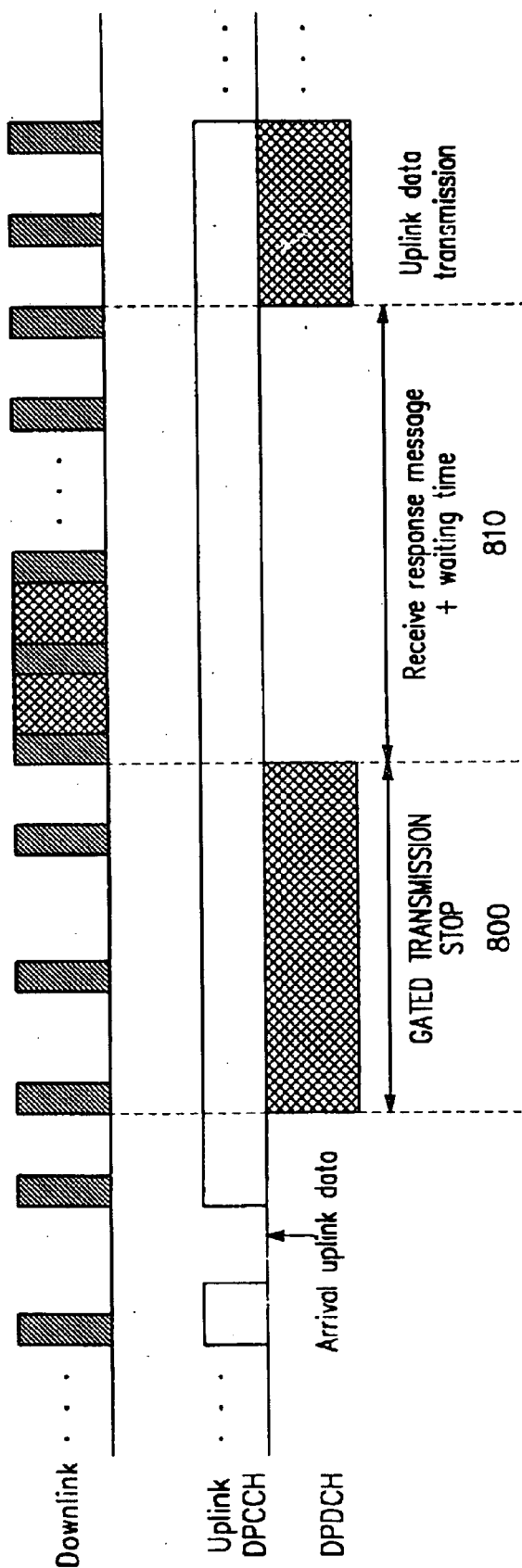
FIG. 8A is a diagram of signals communicated between a UTRAN and an UE(MS) upon generation of uplink transmission data during gated transmission of a dedicated control channel according to the embodiment of the present invention.

FIG. 8A is a diagram of transmitted and received signals of an UE(MS) upon generation of uplink transmission data during gated transmission of a uplink dedicated control channel according to the embodiment of the present invention.

Referring to FIG. 8A, a time when a message indicating that the condition of stopping gated transmission has been satisfied for a period 800 is transmitted should satisfy step 504 of FIG. 5A. In a period 810, the UE(MS) receives the response message from the UTRAN and waits until the time designated in the response message. When the message for the period 800 is transmitted, the dedicated control channel is transmitted in a continuous transmission mode, but it can be a gated transmission mode is available. Similarly, the dedicated control channel is shown to be transmitted continuously for the period 810, but it can be maintained in the gated transmission mode.

Figure 5B:
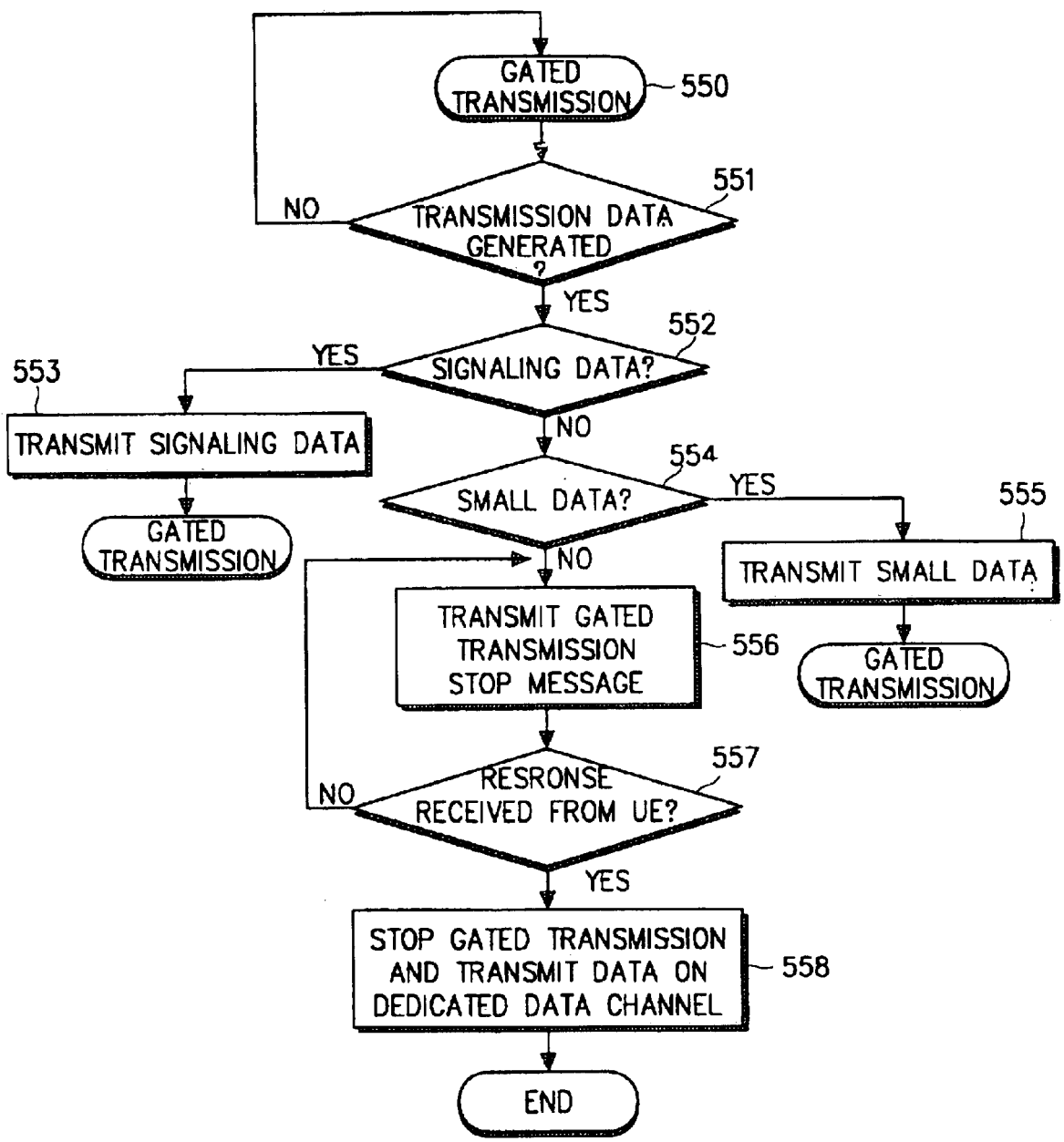
FIG. 5B is a flowchart illustrating a UTRAN operation upon generation of downlink transmission data during a gated transmission according to the embodiment of the present invention.

FIG. 5B is a flowchart illustrating a UTRAN operation when downlink transmission data is generated during gated transmission of a downlink dedicated control channel according to the embodiment of the present invention.

Referring to FIG. 5B, steps 551, 552 and 554 perform the same functions as steps 501, 502 and 504 of FIG. 5A. The UTRAN transmits a gated transmission stop message including information about radio resources to be used and a time point to use them, taking account of the amount of downlink data to transmit. When the UTRAN transmits the gated transmission stop message in step 556, it can transmit the control data on dedicated control channel in a gated transmission mode or in a continuous transmission mode. Also for the period between step 556 and step 557, the control data on dedicated control channel can be transmitted in the gated mode or in the continuous transmission mode. While the UTRAN retransmits the gated transmission stop message when it has not received a response message from the UE(MS) in accordance with the embodiment of the present invention, a different approach can be taken. The UTRAN waits until a time designated in the gated transmission stop message in step 558.

Figure 8B:
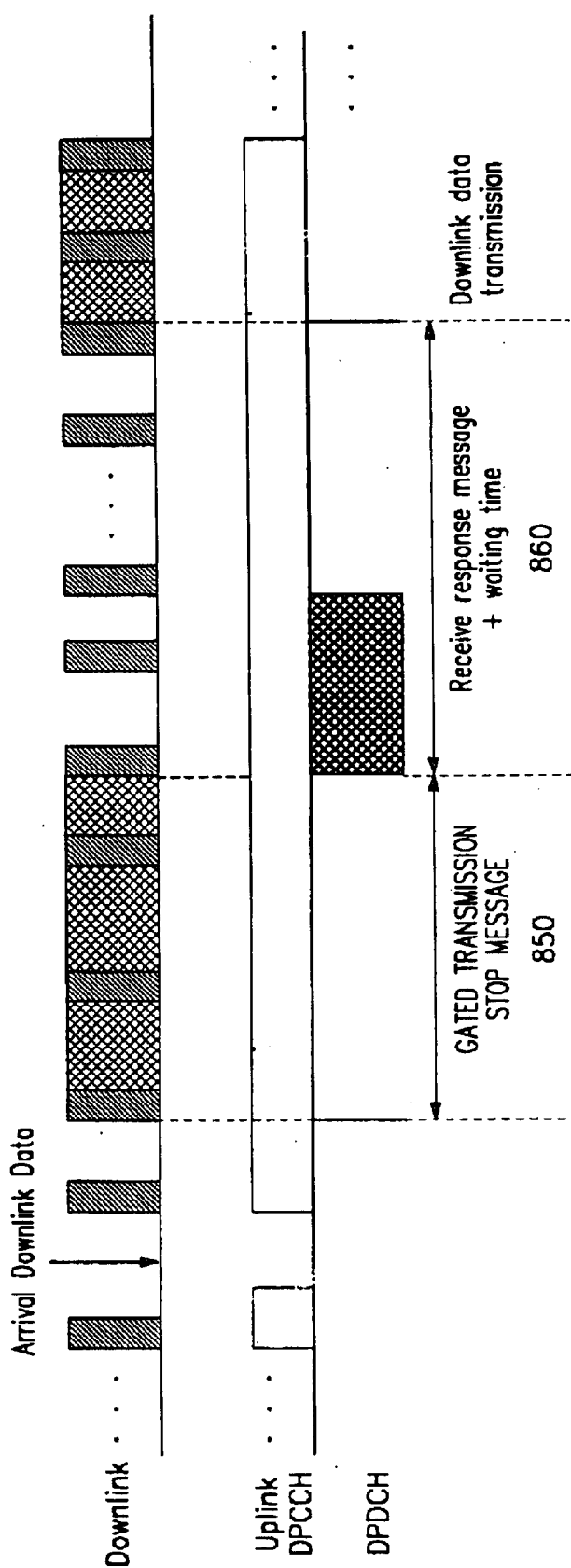
FIG. 8B is a diagram of signals communicated between a UTRAN and an UE(MS) upon generation of downlink transmission data during gated transmission of a dedicated control channel according to the embodiment of the present invention.

FIG. 8B is a diagram of transmitted and received signals of a UTRAN upon generation of downlink transmission data during gated transmission of a downlink dedicated control channel according to the embodiment of the present invention.

Referring to FIG. 8B, though the dedicated control channel is continuously transmitted for periods 850 and 860, it can also be transmitted in a gated mode. The period 860 is set in the gated transmission stop message as indicated by 850.

Continuous transmission of a dedicated control channel, even in the absence of transmission data enables a dedicated data channel to be maintained in a stable manner and transmitted at any time. Despite these advantages, the resulting increase of uplink interference reduces uplink capacity. Power consumption in an UE(MS) is also increased, thereby reducing time available to the UE(MS). In addition, continuous transmission of a downlink dedicated control channel increases downlink interference and decreases downlink capacity. The present invention implements gated transmission of dedicated control channels in order to overcome the problems associated with the conventional methods.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for gated transmission of a dedicated control channel signal for a base station in a W-CDMA communication system in which a dedicated control channel and a dedicated data channel for transmitting packet data are multiplexed prior to transmission, the dedicated control channel having 15 slots in one frame and each slot including a TFCI bit, a TPC bit, and a pilot bit, the method comprising the steps of:

transmitting a gated transmission command message including a gating rate and a gated transmission start time for gated transmission of the dedicated control channel signal to a mobile station, if no data exists on the dedicated data channel for a predetermined period of time; and transmitting the dedicated control channel signal discontinuously at the gated transmission start time set in the gated transmission command message.

2. The method of claim 1, wherein the base station determines the gating rate during a call set-up in agreement with the mobile station.

3. The method of claim 1, wherein the base station determines the gating rate according to channel status when gated transmission is necessary.

4. The method of claim 1, wherein the gated transmission command message further includes a power increment field by which to increase the transmission power of the dedicated data channel signal when data is to be transmitted on the dedicated data channel during the gated transmission of the dedicated control channel signal.

5. The method of claim 4, wherein signaling data is transmitted on the dedicated data channel during the gated transmission of the dedicated control channel signal.

6. The method of claim 4, wherein predetermined small size traffic data is transmitted on the dedicated data channel during the gated transmission of the dedicated control channel signal.

7. The method of claim 1, wherein slots of the dedicated control channel frame are partially transmitted at the gated transmission of the dedicated control channel signal.

8. A method for gated transmission of a dedicated control channel signal for a mobile station in a W-CDMA communication system in which a dedicated control channel signal and a dedicated data channel for transmitting packet data are transmitted, the dedicated control channel having 15 slots in one frame and each slot including a TFCI bit, a TPC bit, and a pilot bit, the method comprising the steps of:

transmitting a gated transmission request message to a base station if no data exists on the dedicated data channel for a predetermined period of time;

receiving a gated transmission command message including a gating rate and a gated transmission start time for gated transmission of the dedicated control channel from the base station; and transmitting the dedicated control channel signal discontinuously at the gated transmission start time set in the gated transmission command message.

9. A method of transmitting a dedicated control channel signal for a base station in a W-CDMA communication system in which a dedicated control channel, which has 15 slots in one frame each slot including a TFCI bit, a TPC bit, and a pilot bit, is transmitted discontinuously, the method comprising the steps of:

transmitting signaling data with the full rate transmission of the dedicated control channel signal if the signaling data is generated during the gated transmission of the dedicated control channel signal;

transmitting a gated transmission stop message to a mobile station upon generation of traffic data which is larger than predetermined size during the gated transmission of the dedicated control channel signal;

stopping the gated transmission of the dedicated control channel signal at a time designated in the gated transmission stop message; and transmitting the traffic data on a dedicated data channel with continuous transmission of dedicated control channel signal.

10. A method of transmitting a dedicated control channel signal for a base station in a W-CDMA communication system in which a dedicated control channel signal, which has 15 slots in one frame each slot including a TFCI, a TPC, and a pilot, is transmitted discontinuously the method comprising the steps of:

transmitting traffic data with the full rate transmission of the dedicated control channel signal upon generation of the traffic data during the gated transmission mode of the dedicated control channel signal if the traffic data is a predetermined size or smaller; and transmitting a gated transmission stop message to a mobile station if the traffic data is above the predetermined size;

stopping the gated transmission at a time designated in the gated transmission stop message; and transmitting the traffic data on a dedicated data channel with continuous transmission of dedicated control channel signal.

11. The method of claim 10, wherein the predetermined size of traffic data transmittable on the dedicated data channel during the gated transmission of the dedicated control channel is 10 ms.

12. A method of transmitting a dedicated control channel signal for a mobile station in a W-CDMA communication system in which a dedicated control channel signal, which has 15 slots in one frame each slot including TFCI bits, TPC bits, and pilot bits, is transmitted in a gated mode, the method comprising the steps of:

transmitting signaling data with the gated transmission of the dedicated control channel signal if the signaling data is generated during the gated transmission of the dedicated control channel signal;

transmitting a gated transmission stop request message to a base station upon generation of traffic data during the gated transmission of the dedicated control channel signal;

stopping the gated transmission at a time designated in a gated transmission stop message upon receipt of the gated transmission stop message from the base station; and transmitting the traffic data on a dedicated data channel with continuous transmission of dedicated control channel signal.

13. A method of transmitting a dedicated control channel signal for a mobile station in a W-CDMA communication system in which a dedicated control channel, which has 15 slots in one frame each slot including a TFCI, a TPC, and a pilot, is transmitted in a gated mode, the method comprising the steps of:

transmitting traffic data with the gated transmission of the dedicated control channel signal upon generation of the traffic data during the gated transmission of the dedicated control channel signal if the traffic data is a predetermined size or smaller;

transmitting a gated transmission stop request message to a base station if the traffic data is above the predetermined size;

stopping the gated transmission at a time designated in a gated transmission stop message upon receipt of the gated transmission stop message; and transmitting the traffic data on a dedicated data channel with continuous transmission of dedicated control channel signal.

* * * * *